United States Patent
Bergeon et al.

(10) Patent No.: US 12,205,095 B2
(45) Date of Patent: *Jan. 21, 2025

(54) CLOUD-BASED CONFIGURABLE TRANSACTION MANAGEMENT CONTROLLER AND METHOD THEREOF

(71) Applicant: Worldpay, LLC, Symmes Township, OH (US)

(72) Inventors: Francois B. Bergeon, Scottsdale, AZ (US); Scot A. Bryant, Chandler, AZ (US); Coy A. Christensen, Scottsdale, AZ (US)

(73) Assignee: Worldpay, LLC, Symmes Township, OH (US)

( * ) Notice: Subject to any disclaimer, the term of this patent is extended or adjusted under 35 U.S.C. 154(b) by 317 days.

This patent is subject to a terminal disclaimer.

(21) Appl. No.: 17/955,685

(22) Filed: Sep. 29, 2022

(65) Prior Publication Data
US 2023/0016290 A1    Jan. 19, 2023

Related U.S. Application Data

(63) Continuation of application No. 14/976,384, filed on Dec. 21, 2015, now Pat. No. 11,488,128.

(51) Int. Cl.
*G06Q 20/20* (2012.01)
*G06Q 20/38* (2012.01)
*G06Q 20/40* (2012.01)

(52) U.S. Cl.
CPC ......... *G06Q 20/202* (2013.01); *G06Q 20/204* (2013.01); *G06Q 20/208* (2013.01); *G06Q 20/3825* (2013.01); *G06Q 20/401* (2013.01)

(58) Field of Classification Search
CPC .. G06Q 20/202; G06Q 20/204; G06Q 20/208; G06Q 20/3825; G06Q 20/401
See application file for complete search history.

(56) References Cited

U.S. PATENT DOCUMENTS

2004/0044575 A1* 3/2004 Bakker ............... G06Q 30/02
                                                            705/14.27
2009/0319382 A1   12/2009 Shah et al.
(Continued)

OTHER PUBLICATIONS

Greenman, "Micros/Oracle EMV Chip Solution is Here!", Dec. 2016, https://www.skurlas.com/oracle-news/micros/oracle-emv-chip-solution-is-here (Year: 2016).*

(Continued)

*Primary Examiner* — Allen C Chein
(74) *Attorney, Agent, or Firm* — Bookoff McAndrews, PLLC

(57) ABSTRACT

Technologies for remotely managing payment authorization request messaging for payment transactions include a transaction management controller of one environment and a point of interaction device of another environment. The transaction management controller receives a transaction amount for a payment transaction from a business management engine. The payment transaction is based on a purchase transaction initiated by a merchant computing device of the other environment. The transaction management controller also receives payment card data from the point of interaction device, which is communicatively isolated from the merchant computing device and the business management engine. The transaction management controller inserts the transaction amount and the payment card data into a payment authorization request message, which is transmitted to a payment network. A payment authorization response message is received from the payment network and transmitted by the transaction management controller to the business management engine. Other embodiments are described and claimed.

20 Claims, 6 Drawing Sheets

(56) References Cited

U.S. PATENT DOCUMENTS

| | | |
|---|---|---|
| 2013/0185152 A1 | 7/2013 | Aaron et al. |
| 2015/0081462 A1* | 3/2015 | Ozvat ................... G06Q 20/202 |
| | | 705/21 |
| 2016/0063496 A1 | 3/2016 | Royyuru et al. |
| 2016/0196557 A1 | 7/2016 | Davis et al. |
| 2020/0111074 A1* | 4/2020 | Chau ................... G06Q 20/204 |

OTHER PUBLICATIONS

Shoenecker, Gerry, "EMV Payments: Changes at the Point of Sale", Feb. 2014, https://www.securetechalliance.org/secure/events/20140205/workshop/TUE_1015_04Schoenecker_SCA_EMV_Impacts_at_the_POS_02_2014.pdf (Year: 2014).*

* cited by examiner

CLOUD-BASED CONFIGURABLE TRANSACTION MANAGEMENT CONTROLLER AND METHOD THEREOF

CROSS-REFERENCE TO RELATED APPLICATION(S)

This patent application is a continuation of and claims the benefit of priority to U.S. application Ser. No. 14/976,384, filed on Dec. 21, 2015, the entirety of which is incorporated herein by reference.

TECHNICAL FIELD

Embodiments of the technologies described herein relate, in general, to the field of payment transactions. More particularly, the technologies described herein relate to the field of remotely managing payment authorization request messaging for payment transactions.

BACKGROUND

Merchants accept consumer payments for goods and services through point-of-sale ("POS") terminals and corresponding business applications. Configuring such POS terminals and business applications to accept and process payment transactions is a complex and time consuming process. For example, conventional POS terminals and business applications must be configured to support and communicate with various different payment networks as well as a variety of different card readers and PIN pads. Such configuration typically requires sophisticated programming knowledge in connection with payment processing transactions. Additionally, POS terminals are increasingly being required to be certified by various payment networks, a process which is also complex and time consuming.

SUMMARY

In an embodiment, the present disclosure is directed, in part, to a method for remotely managing payment authorization request messaging for payment transactions. The method includes receiving, by a transaction management controller of an independent software vendor environment and from a business management engine of the independent software vendor environment, a transaction amount for a payment transaction. The payment transaction is based on a purchase transaction initiated by a merchant computing device of a merchant environment and the transaction amount is for insertion by the transaction management controller into a payment authorization request message. The method further includes requesting, by the transaction management controller and from a point of interaction device of the merchant environment, payment card data for the payment authorization request message. In some embodiments, the business management engine and the merchant computing device are communicatively isolated from the point of interaction device. In addition, the method includes receiving, by the transaction management controller and from the point of interaction device, the requested payment card data for insertion by the transaction management controller into the payment authorization request message. The method also includes inserting, by the transaction management controller, the payment card data received from the point of interaction device and the transaction amount received from the business management engine into the payment authorization request message. The method further includes transmitting, by the transaction management controller and to a payment network, the payment authorization request message and receiving, by the transaction management controller and from the payment network, a payment authorization response message for the payment authorization request message. The method also includes transmitting, by the transaction management controller and to the business management engine, the payment authorization response message.

In another embodiment, the present disclosure is directed, in part, to a method for remotely managing payment authorization request messaging for payment transactions. The method includes receiving, by a transaction management controller of a payments integrator environment and from a business management engine remote from the transaction management controller, a transaction amount for a payment transaction. The payment transaction is based on a purchase transaction initiated by a merchant computing device of a merchant environment and the transaction amount is for insertion by the transaction management controller into a payment authorization request message. The method further includes requesting, by the transaction management controller and from a point of interaction device of the merchant environment, payment card data for the payment authorization request message. In some embodiments, the merchant computing device and the business management engine are communicatively isolated from the point of interaction device. In addition, the method includes receiving, by the transaction management controller and from the point of interaction device, the requested payment card data for insertion by the transaction management controller into the payment authorization request message. The method also includes inserting, by the transaction management controller, the payment card data received from the point of interaction device and the transaction amount received from the business management engine into the payment authorization request message. The method further includes transmitting, by the transaction management controller and to a payment network, the payment authorization request message and receiving, by the transaction management controller and from the payment network, a payment authorization response message for the payment authorization request message. The method also includes transmitting, by the transaction management controller and to the business management engine, the payment authorization response message.

In yet another embodiment, the present disclosure is directed, in part, to a system for remotely managing payment authorization request messaging for payment transactions. The system includes an independent software vendor environment, which includes a business management engine and a transaction management controller. The transaction management controller includes a processor executing instructions stored in memory. The instructions cause the processor of the transaction management controller to receive, from the business management engine, a transaction amount for a payment transaction. In some embodiments, the payment transaction is based on a purchase transaction initiated by a merchant computing device of a merchant environment and the transaction amount is for insertion by the transaction management controller into a payment authorization request message. The instructions further cause the processor of the transaction management controller to request, from a point of interaction device of the merchant environment, payment card data for the payment authorization request message. In some embodiments, the business management engine and the merchant computing device are communicatively isolated from the point of interaction device. Additionally, the instructions cause the processor of the transaction management controller to receive, from the point of interaction device, the requested payment card data for insertion by the transaction management controller into the payment authorization request message. The instructions also cause the processor of the transaction management controller to insert the payment card data received from the point of interaction device and the transaction amount received from the business management engine into the payment authorization request message. The instructions further cause the processor of the transaction management controller to transmit, to a payment network, the payment authorization request message and receive, from the payment network, a payment authorization response message for the payment authorization request message. The instructions also cause the processor of the transaction management controller to transmit, to the business management engine, the payment authorization response message.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
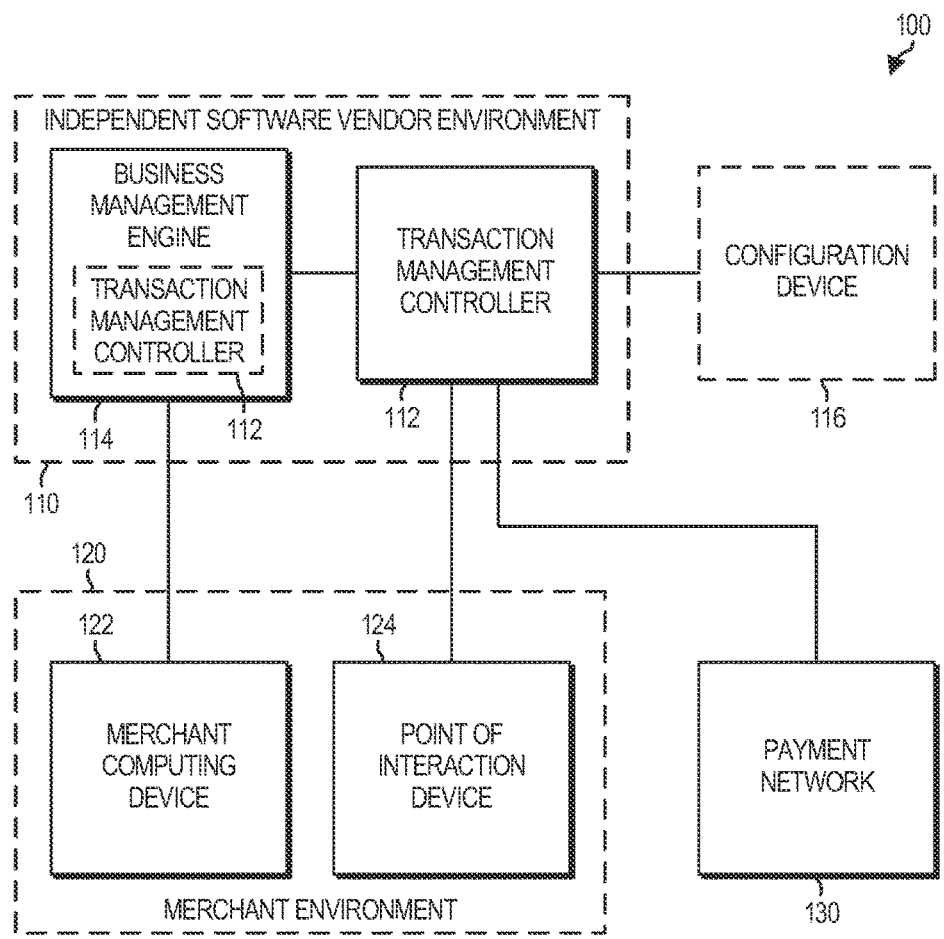
FIG. 1 is a simplified block diagram of at least one embodiment of a system for remotely managing payment authorization request messaging for payment transactions.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles or payment card can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument.

Referring now to FIG. 1, in one embodiment, a system 100 for remotely managing payment authorization request messaging for payment transactions includes an independent software vendor (ISV) environment 110, a merchant environment 120, and a payment network 130. In the illustrative embodiment, the ISV environment 110 and the merchant environment 120 are separate and distinct computing and/or communication environments. Additionally, in some embodiments, the system 100 includes a configuration device 116.

In some embodiments, the merchant environment 120 is defined by a merchant-specific system architecture or computing environment, which can be made up of various communication networks and computing devices (e.g., sales terminals, back-end servers, payment entry devices, card readers, mobile devices, etc.) that facilitate the sale of goods and/or services for a particular merchant, retailer, service provider, vendor, or any other type of entity that sells, or offers to sell, a good and/or service. It should be appreciated that one or more devices of the merchant environment 120 can be controlled and/or operated by a specific merchant to support internal sales and accounting activities for that merchant. In the illustrative embodiment, the merchant environment 120 includes a merchant computing device 122 and a point of interaction device 124. Of course, the merchant environment 120 may include other computing devices or architectures commonly used by retail merchants, which are not illustrated in FIG. 1 for clarity of the description.

In some embodiments, the ISV environment 110 is defined by a vendor-specific system architecture or computing environment, which can be made up of various communication networks and computing devices (e.g., servers, controllers, computing devices, etc.) that facilitate the provision of electronic services or products (e.g., software as a service (SaaS), software products, remote processing, cloud-based services, etc.) to merchants and other entities. It should be appreciated that one or more devices of the ISV environment 110 can be controlled and/or operated by a software and/or electronic service vendor to support all or a portion of sales and accounting activities for one or more merchants. In the illustrative embodiment, the ISV environment includes a business management engine 114 and a transaction management controller 112. In some embodiments, the business management engine 114 and the transaction management controller 112 may not be separate devices or components. Rather, the business management engine 114 may include the transaction management controller 112, in some embodiments. Of course, the ISV environment 110 may include other computing devices or architectures commonly used by software and/or electronic service vendors, which are not illustrated in FIG. 1 for clarity of the description. As discussed, the ISV environment 110 can be a separate and distinct computing and/or communication environment from the merchant environment 120.

In operation, a purchase transaction is initiated by the merchant computing device 122 of the merchant environment 120. The merchant computing device 122 of the merchant environment 120 communicates with the business management engine 114 of the ISV environment 110 in connection with the purchase transaction. Subsequently, the transaction management controller 112 receives a payment request from the business management engine 114 in connection with a payment transaction corresponding to the purchase transaction. The payment request includes a transaction amount and can be embodied as a Hypertext Transfer Protocol (HTTP) message. After receiving the payment request, the transaction management controller 112 of the ISV environment 110 requests payment card data (e.g., a payment card number, a payment card type, etc.) for the payment transaction from the POI device 124 (e.g., a card reader, a PIN pad, etc.) of the merchant environment 120. In the illustrative embodiment, the POI device 124 is communicatively isolated from the merchant computing device 122 and the business management engine 114.

Once the payment card data is received from the POI device 124, the transaction management controller 112 inserts the received transaction amount and the payment card data into a payment authorization request message. The transaction management controller 112 transmits the payment authorization request message to the payment network 130, which as described in more detail below, can be embodied as, or otherwise include, a payment gateway (not shown). A payment authorization response message is then received from the payment network 130 (or the payment gateway) in response to the payment authorization request message. The transaction management controller 112 transmits the received payment authorization response message to the business management engine 114.

In some embodiments, the transaction management controller 112 is configured to interface with and control features and/or functionality of the POI device 124. For example, in some embodiments, the transaction management controller 112 can be configured to control selectable options (e.g., payment card type selections, cashback selections, transaction amount verification, language selections, etc.) that are to be displayed to a consumer via the POI device 124. Additionally or alternatively, the transaction management controller 112 can be configured to control payment transaction processing features (e.g., signature prompting features, PIN entry features, customized informational display screens, scrolling receipt features, etc.) provided by the POI device 124. Additionally, in some embodiments, the transaction management controller 112 can manage multiple POI devices (not shown) of the merchant environment 120. For example, the transaction management controller 112 can be configured to control multiple POI devices of a multi-lane merchant environment such as the one described in commonly-owned U.S. patent application Ser. No. 14/755,320, entitled "CONFIGURABLE TRANSACTION MANAGEMENT CONTROLLER AND METHOD THEREOF," which is hereby incorporated by reference in its entirety.

Figure 2:
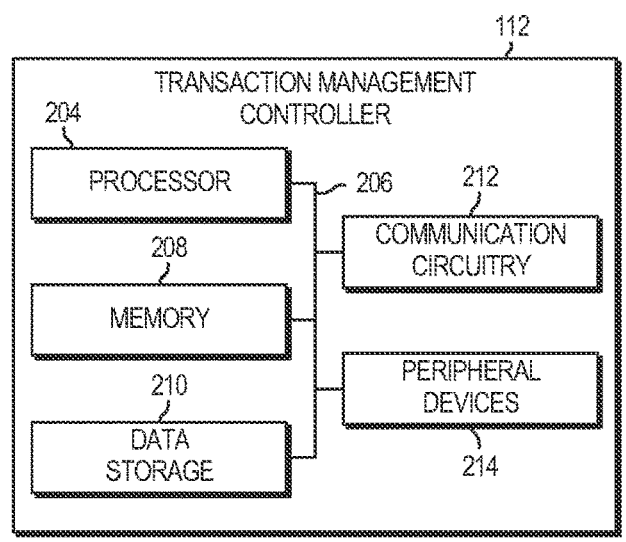
FIG. 2 is a simplified block diagram of at least one embodiment of the transaction management controller of the system of FIG. 1.

The transaction management controller 112 can be embodied as any type of computing device or server or capable of processing, communicating, storing, maintaining, and transferring data. For example, the transaction management controller 112 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the transaction management controller 112 can be embodied as a computing device integrated with other systems or subsystems. In the illustrative embodiment of FIG. 2, the transaction management controller 112 includes a processor 204, a system bus 206, a memory 208, a data storage 210, communication circuitry 212, and one or more peripheral devices 214. Of course, the transaction management controller 112 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 208, or portions thereof, can be incorporated in the processor 204 in some embodiments. Furthermore, it should be appreciated that the transaction management controller 112 can include other components, sub-components, and devices commonly found in a computer and/or computing device, which are not illustrated in FIG. 2 for clarity of the description.

The processor 204 can be embodied as any type of processor capable of performing the functions described herein. For example, the processor 204 can be embodied as a single or multi-core processor, a digital signal processor, microcontroller, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

In various configurations, the transaction management controller 112 includes a system bus 206 for interconnecting the various components of the transaction management controller 112. The system bus 206 can be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations with the processor 204, the memory 208, and other components of the transaction management controller 112. In some embodiments, the transaction management controller 112 can be integrated into one or more chips such as a programmable logic device or an application specific integrated circuit (ASIC). In such embodiments, the system bus 206 can form a portion of a system-on-a-chip (SoC) and be incorporated, along with the processor 204, the memory 208, and other components of the transaction management controller 112, on a single integrated circuit chip.

The memory 208 can be embodied as any type of volatile or non-volatile memory or data storage capable of performing the functions described herein. For example, the memory 208 can be embodied as read only memory (ROM), random access memory (RAM), cache memory associated with the processor 204, or other memories such as dynamic RAM (DRAM), static RAM (SRAM), programmable ROM (PROM), electrically erasable PROM (EEPROM), flash memory, a removable memory card or disk, a solid state drive, and so forth. In operation, the memory 208 can store various data and software used during operation of the transaction management controller 112 such as operating systems, applications, programs, libraries, and drivers.

The data storage 210 can be embodied as any type of device or devices configured for short-term or long-term storage of data such as, for example, memory devices and circuits, memory cards, hard disk drives, solid-state drives, or other data storage devices. For example, in some embodiments, the data storage 210 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 204, or the memory 208 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

In some embodiments, the data storage device 110 can be configured to store a set of local payment processing features of the transaction management controller 112. Each feature can be configured to provide different functionality of the transaction management controller 112 and/or the POI device 124. As such, each feature can be toggled "on" or toggled "off" to control the features provided by the transaction management controller 112 and/or the POI device 124. The local payment processing features can include device configuration features and/or settings (e.g., listening port settings, security settings, user settings, etc.), transaction professing features and/or settings (e.g., partial approval features, transaction amount confirmation features, cashback features, accepted payment card settings, supported language settings, transaction gratuity features, signature requirement features, transaction store and forward features, etc.), multilane features and/or settings (e.g., lane identification features, lane initialization settings, etc.), POI device 124 features and/or settings (e.g., terminal type settings, driver configurations, communication settings, etc.), and any other type of payment processing feature or configuration setting for the transaction management controller 112 or a device controlled or managed thereby (e.g., the POI device 124).

The communication circuitry 212 of the transaction management controller 112 may be embodied as any type of communication circuit, device, interface, or collection thereof, capable of enabling communications between the transaction management controller 112 and the business management engine 114, merchant computing device 122, POI device 124, payment network 130, configuration device 116, and/or any other computing device communicatively coupled thereto. For example, the communication circuitry 212 may be embodied as one or more network interface controllers (NICs), in some embodiments. The communication circuitry 212 may be configured to use any one or more communication technologies (e.g., wireless or wired communications) and associated protocols (e.g., Ethernet, WiMAX, etc.) to effect such communication.

In some embodiments, the transaction management controller 112, business management engine 114, merchant computing device 122, POI device 124, payment network 130, configuration device 116, and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication between the computing devices of the system 100.

Additionally, in some embodiments, the transaction management controller 112 can further include one or more peripheral devices 214. Such peripheral devices 214 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

Referring back to FIG. 1, the business management engine 114 can be embodied as any type of computing device capable of performing the functions described herein. As such, the business management engine 114 can include devices and structures commonly found in computing devices such as processors, memory devices, communication circuitry, and data storages, which are not shown in FIG. 1 for clarity of the description. The business management engine 114 can be configured to perform certain business-related functions, such as, without limitation, sales tabulation, inventory management, scheduling, accounting processes, payroll, and the like. As is to be appreciated, the particular business-related functions facilitated by a business management engine may depend on the needs of the particular business (e.g., merchant) utilizing the business management engine. In this regard, a business management engine of a salon may provide different business-related functions than that of a specialty retailer, for example. It should be appreciated, however, that the business management engine 114 (and the other components of the system 100) may be associated with and provide business-related functions for any other types of merchants or industries (e.g., restaurants, retail, lodging, car rental agencies, etc.). In some embodiments, such as the one illustratively shown in FIG. 1, the business management engine 114 is a back-end system or server configured to provide part or all of the business-related functions of a particular merchant. In such embodiments, the business management engine 114 may be configured to communicate with the merchant computing device 122 of the merchant environment 120 to provide such business-related functions (or portions thereof).

Additionally, in some embodiments, the business management engine 114 is configured to initiate payment transactions, each of which can correspond to a purchase transaction initiated by the merchant computing device 122 of the merchant environment 120. As discussed in more detail below, the business management engine 114 is configured to communicate with the transaction management controller 112 to facilitate processing such payment transactions. For example, in some embodiments, the business management engine 114 is configured to transmit a payment request to the transaction management controller 112. The payment request can be embodied as an HTTP message that includes the amount of the transaction. Additionally, the business management engine 114 can be configured to receive a payment authorization response message from the transaction management controller 112. As discussed in more detail below, the business management engine 114 can be communicatively isolated from the POI device 124 (e.g., not in direct communication with the POI device 124). As such, instead of being directly connected to the POI device 124, the business management engine 114 is communicatively coupled to the transaction management controller 112, which manages communications with the POI device 124. It should be appreciated that in doing so, the complexity of configuring (e.g., coding, certification, initialization, etc.) of the business management engine 114 is reduced.

Additionally, in some embodiments, the business management engine 114 can transmit data to the transaction management controller 112 for subsequent display on the POI device 124 during a purchase or payment transaction. For example, in some embodiments, the business management engine 114 can be configured to transmit scrolling receipt data to the transaction management device 102. In turn, the transaction management device 102 can transmit the scrolling receipt data to the POI device 124. In such embodiments, the scrolling receipt data can include product scan data (e.g., product identifiers, product names, product descriptions, etc.) and product sales price data. It should be appreciated that the scrolling receipt data can include any other type of data associated with a purchase or payment transaction.

The business management engine 114 can also transmit payment details and/or a transaction summary to the merchant computing device 122. For example, in some embodiments, the business management engine 114 is configured to also transmit received payment authorization response messages, or payment details derived from received payment authorization messages, to the merchant computing device 122 for display or review. Additionally, the business management engine 114 can be configured to transmit transaction summary data (e.g., product scan data, product name, product descriptions, prices, calculated taxes, totals, etc.) to the merchant computing device 122 for display or review.

As discussed, the merchant environment 120 can include the merchant computing device 122 and the point of interaction device 124. The merchant computing device 122 can be embodied as any type of computing device capable of performing the functions described herein. For example, in the illustrative embodiment, the merchant computing device 122 can be embodied as a mobile computing device, a handheld computer, a smart phone, a tablet computer, a personal digital assistant, a laptop computer, a desktop computer, an electronic cash register, a server, a microcomputer, a minicomputer, a mainframe, a telephony device, a custom chip, an embedded processing device, or other computing device and/or suitable programmable device. As such, the merchant computing device 122 can include devices and structures commonly found in computing devices such as processors, memory devices, communication circuitry, and data storages, which are not shown in FIG. 1 for clarity of the description. In some embodiments, the merchant computing device 122 is communicatively isolated from the POI device 124.

As discussed above, in some embodiments, the business management engine 114 may be configured to provide part or all of the business-related functions of a particular merchant. In such embodiments, the merchant computing device 122 can be configured to communicate with the business management engine 114 to utilize those business-related functions. To do so, the merchant computing device 122 can include one or more applications to facilitate communications with the business management engine 114. For example, in some embodiments, the merchant computing device 122 may be a tablet computing device that includes a business application or a web browser configured to communicate with the business management engine 114. In such embodiments, the business management engine 114 can be configured to provide one or more business-related functions to the tablet computing device (e.g., the merchant computing device 122) via the business application and/or the web browser. It should be appreciated, however, that the merchant computing device 122 may be embodied as any other type of computing device that includes any other technology for communicating with the business management engine 114 to cooperatively provide all or a portion of a business-related function.

The point of interaction (POI) device 124 can be embodied as any type of computing or payment device capable of performing the functions described herein. For example, in the illustrative embodiment, the POI device 124 can be embodied as a card reader or a PIN pad configured to facilitate receipt of a payment card for a payment transaction (e.g., a credit or debit transaction). The POI device 124 can include devices and structures commonly found in computing and payment devices such as processors, memory devices, communication circuitry, and data storages, which are not shown in FIG. 1 for clarity of the description. For example, in some embodiments, the POI device 124 can include payment hardware and functionality configured for receiving traditional payment cards containing magnetic stripes (e.g., magstripes, swipe cards, etc.). Additionally or alternatively, in some embodiments, the POI device 124 can include integrated circuit payment hardware and functionality configured for receiving a EUROPAY, MASTERCARD, AND VISA (EMV) payment card or other smartcard. Of course, the POI device 124 can include any other type of payment hardware and functionality for receiving a payment card or vehicle.

As discussed, in some embodiments, the POI device 124 is communicatively isolated from the merchant computing device 122. In some embodiments, the POI device 124 is also communicatively isolated from the business management engine 114. In such embodiments, the POI device 124 instead communicates directly with the transaction management controller 112 via a wired or wireless communication link (i.e., a point-to-point link, bus link, wire, cable, light guide, wireless link, etc.). As such, the POI device 124 can be controlled by the transaction management controller 112, which can include the necessary drivers to do so.

The payment network 130 can be, for example, a network of a credit card association affiliated with a payment vehicle or payment card (e.g., credit cards, debit cards, smart cards, single-use cards, pre-paid cards, electronic currency, etc.), which generally refers to any type of financial alternative to currency. Non-limiting examples of credit card associations include VISA, MASTERCARD, DISCOVER, and AMERICAN EXPRESS. In some embodiments, the payment network 130 receives a payment authorization request message from the transaction management controller 112 for a payment transaction. The payment network 130 can provide the payment authorization request message to a payment processing server of an issuer processor, which in turn can provide the payment authorization request message to an issuer financial institution. The issuer financial institution can then associate the payment vehicle or payment card used with an account held by the issuer financial institution. Thereafter, the issuer financial institution can transmit a payment authorization response message to the payment network 130 via the issuer processor. In response to receiving the payment authorization response message, the payment network 130 can transmit the payment authorization response message to the transaction management controller 112. In some embodiments, the payment network 130 includes a payment gateway (not shown) configured to facilitate the transaction management controller 112 or, more generally, merchants in processing payment transactions.

The configuration device 116 can be embodied as any type of computing device capable of performing the functions described herein. As such, the configuration device 116 can include devices and structures commonly found in computing devices such as processors, memory devices, communication circuitry, and data storages, which are not shown in FIG. 1 for clarity of the description. In some embodiments, the configuration device 116 is configured to configure and/or manage payment processing features of the transaction management controller 112, multiple transaction management controllers (not shown), and/or other devices of the system 100 (e.g., the POI device 124). To do so, the configuration device 116 can generate one or more feature modification message, which can be transmitted to the transaction management controller. As discussed in more detail below, the feature modification message can include configuration data, which can be used by the transaction management controller 112 to add or modify a local payment processing feature. In embodiments in which the configuration device 116 is configured to configure and/or manage multiple transaction management controllers, the configuration device 116 can selectively transmit feature modification messages to each transaction management controller. Additionally, it should be appreciated that the configuration device 116 can be local or remote to any one of the environments (e.g., the ISV environment 110, the merchant environment 120, and the payments integrator environment 330) of the systems 100, 300, 400 illustratively shown in FIGS. 1, 3, and 4.

In some embodiments, the transaction management controller 112, the business management engine 114, the merchant computing device 122, the point of interaction device 124, the payment network 130 (or computing devices thereof), and the configuration device 116 can each establish an environment during operation. Each environment can include various modules, components, sub-components, and devices commonly found in computing devices, which are not illustrated in the figures for clarity of the description. The various modules, components, sub-components, and devices of each environment can be embodied as hardware, firmware, software, or a combination thereof. For example, one or more of the modules, components, sub-components, and devices of each environment can be embodied as a processor and/or a controller configured to provide the functionality described herein.

Figure 3:
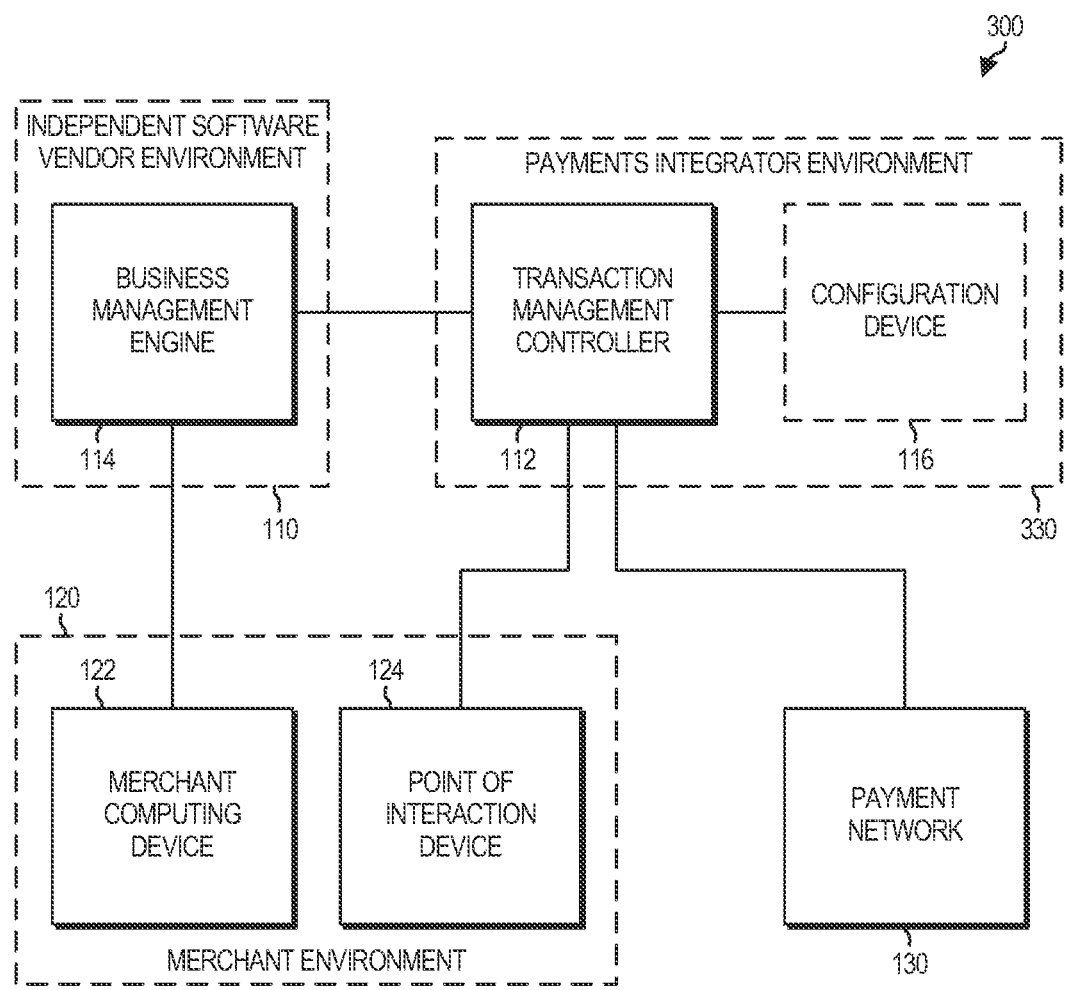
FIG. 3 is a simplified block diagram of at least one embodiment of another system for remotely managing payment authorization request messaging for payment transactions.

Referring now to FIG. 3, in another embodiment, a system 300 for remotely managing payment authorization request messaging for payment transactions includes the independent software vendor (ISV) environment 110, the merchant environment 120, and the payment network 130. As illustratively shown, the ISV environment 110 includes the business management engine 114 and the merchant environment 120 includes the merchant computing device 122 and the point of interaction device 124. It should be appreciated that one or more of the devices and environments illustratively shown in FIG. 3 may be substantially similar to the corresponding devices and environments illustratively shown and described with respect to FIGS. 1 and 2.

Additionally, as illustratively shown, the system 300 includes a payments integrator environment 330. In some embodiments, the payments integrator environment 330 is defined by a payments integrator-specific system architecture or computing environment, which can be made up of various communication networks and computing devices (e.g., servers, controllers, computing devices, etc.) that facilitate the provision of payment integration services or products to independent software vendors, merchants, or any other entity that receives, facilitates receipt of, or processes payments. It should be appreciated that one or more devices of the payments integrator environment 330 can be controlled and/or operated by a payments integration vendor and/or a payments processor to provide the payment processing and/or integration services discussed herein. As illustratively shown, the payments integrator environment 330 includes the transaction management controller 112 and, in some embodiments, the configuration device 116. Of course, the payments integrator environment 330 may include other computing devices or architectures commonly used by integration vendors and/or payment processors, which are not illustrated in FIG. 3 for clarity of the description. As shown, the payments integrator environment 330 can be a separate and distinct computing and/or communication environment from the ISV environment 110 and the merchant environment 120.

In some embodiments, the business management engine 114 of the ISV environment 110 of the system 300 is configured to initiate payment transactions, each of which can correspond to a purchase transaction initiated by the merchant computing device 122 of the merchant environment 120. In such embodiments, the business management engine 114 of the ISV environment 110 is configured to communicate with the transaction management controller 112 of the payments integrator environment 330 to facilitate processing such payment transactions. For example, in some embodiments, the business management engine 114 of the ISV environment 110 is configured to transmit a payment request to the transaction management controller 112 of the payments integrator environment 330. The payment request can be embodied as an HTTP message that includes the amount of the transaction. Additionally, the business management engine 114 can be configured to receive a payment authorization response message from the transaction management controller 112. As discussed, the business management engine 114 of the ISV environment 110 can be communicatively isolated from the POI device 124 (e.g., not in direct communication with the POI device 124) of the merchant environment 120. As such, instead of being directly connected to the POI device 124 of the merchant environment 120, the business management engine 114 of the ISV environment 110 is communicatively coupled to the transaction management controller 112 of the payments integrator environment 330, which manages communications with the POI device 124. It should be appreciated that in doing so, the complexity of configuring (e.g., coding, certification, initialization, etc.) of the business management engine 114 is reduced.

Figure 4:
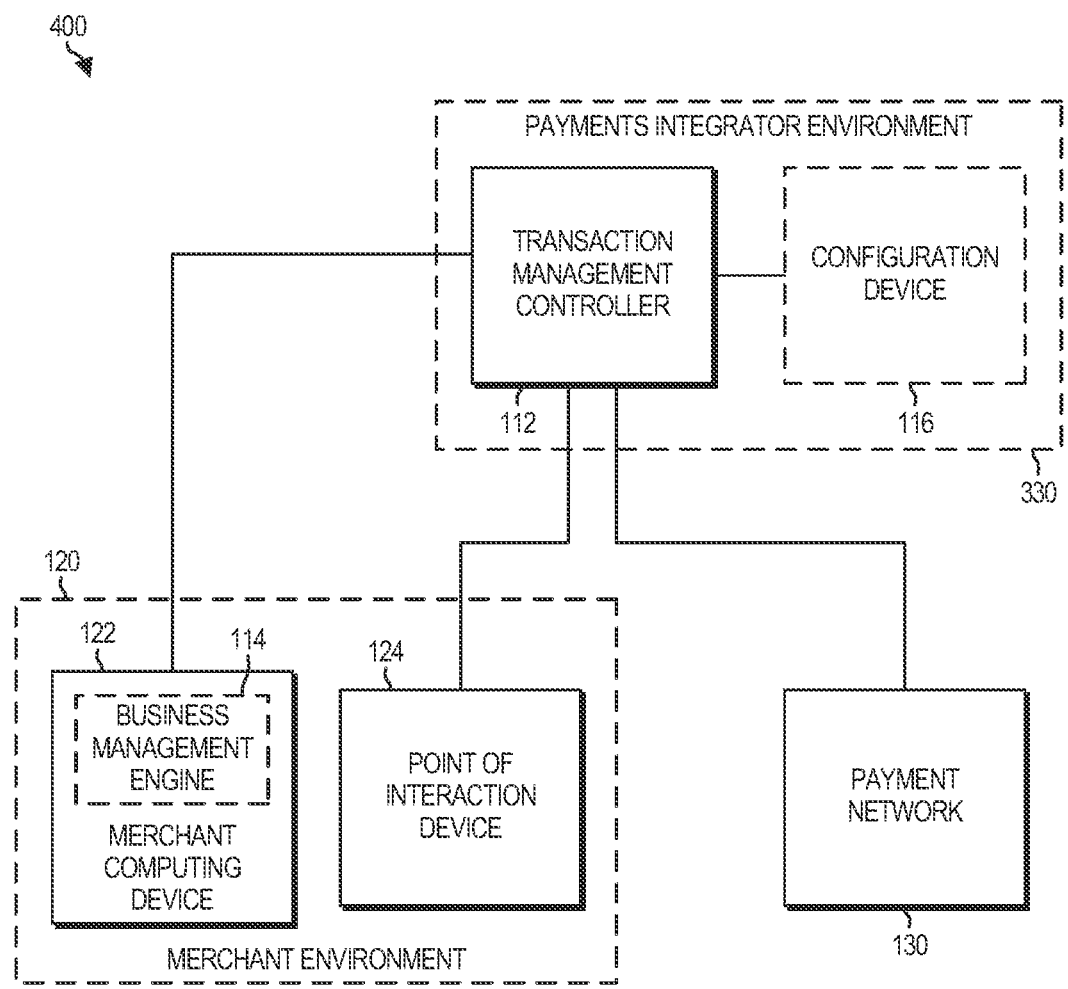
FIG. 4 is a simplified block diagram of at least one embodiment of another system for remotely managing payment authorization request messaging for payment transactions.

Referring now to FIG. 4, in another embodiment, a system 400 for remotely managing payment authorization request messaging for payment transactions includes the merchant environment 120, the payments integrator environment 330, and the payment network 130. As illustratively shown, the merchant environment 120 includes the point of interaction device 124 and the merchant computing device 122, which may include the business management engine 114, in some embodiments. Additionally, the illustrative payments integrator environment 330 includes the transaction management controller 112 and, in some embodiments, the configuration device 116. It should be appreciated that one or more of the devices illustratively shown in FIG. 4 may be substantially similar to the corresponding devices and environments illustratively shown and described with respect to FIGS. 1-3.

In some embodiments, the business management engine 114 of the merchant environment 120 of the system 400 is configured to initiate payment transactions, each of which can correspond to a purchase transaction initiated by the merchant computing device 122 of the merchant environment 120. In such embodiments, the business management engine 114 of the merchant environment 120 is configured to communicate with the transaction management controller 112 of the payments integrator environment 330 to facilitate processing such payment transactions. For example, in some embodiments, the business management engine 114 of the merchant environment 120 is configured to transmit a payment request to the transaction management controller 112 of the payments integrator environment 330. The payment request can be embodied as an HTTP message that includes the amount of the transaction. Additionally, the business management engine 114 can be configured to receive a payment authorization response message from the transaction management controller 112. As illustratively shown, the business management engine 114 of the merchant environment 120 can be communicatively isolated from the POI device 124 (e.g., not in direct communication with the POI device 124) of the merchant environment 120. As such, instead of being directly connected to the POI device 124 of the merchant environment 120, the business management engine 114 of the merchant environment 120 is communicatively coupled to the transaction management controller 112 of the payments integrator environment 330, which manages communications with the POI device 124 of the merchant environment 120. It should be appreciated that in doing so, the complexity of configuring (e.g., coding, certification, initialization, etc.) of the business management engine 114 is reduced.

Figure 5:
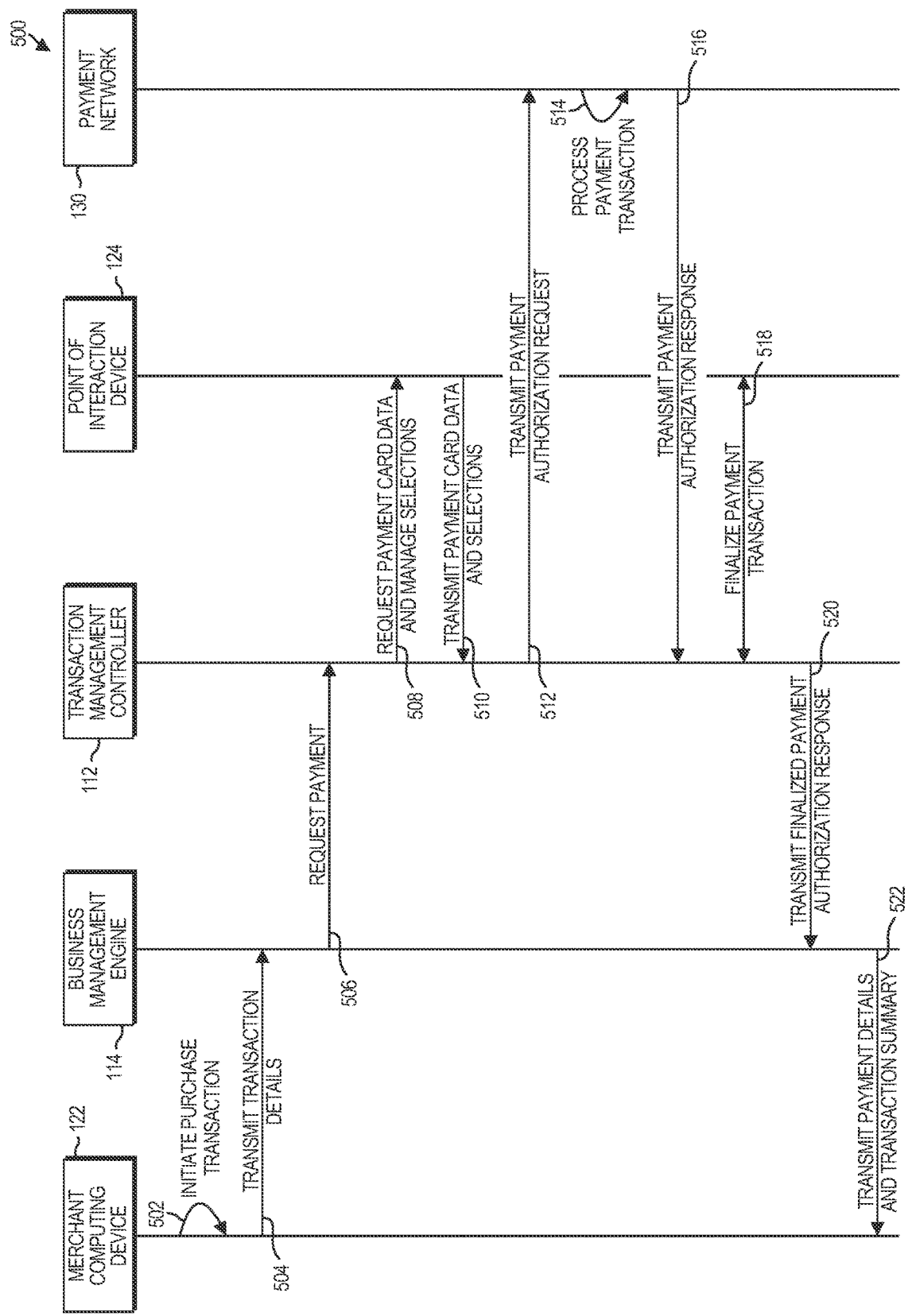
FIG. 5 is a simplified sequence flow diagram in accordance with at least one non-limiting embodiment.

Referring now to FIG. 5, a process 500 that may be executed by the devices of the systems 100, 300, 400 begins with process flow 502. In process flow 502, the merchant computing device 122 initiates a purchase transaction. The purchase transaction may be associated with the sale of a good or a service by a merchant, retailer, or other entity. In some embodiments, the purchase transaction can be initiated via business-related functionality and/or business software executing on, or electronically accessed by, the merchant computing device 122 during a sale. As discussed, in some embodiments, all or a portion of the business-related functionality can be provided by the business management engine 114, which may either be remote from the merchant computing device 122 or form a part of the merchant computing device 122. For example, during a purchase transaction occurring at a brick-and-mortar location of a merchant, a salesperson may use the merchant computing device 122 to enter a product identifier and/or a price of each product being purchased into a retail sales system, the functionality of which (or a portion of the functionality) may be provided by the business management engine 114.

In process flow 504, the merchant computing device 122 may transmit details corresponding to the transaction to the business management engine 114. The transaction details can include product scan data (e.g., product identifiers) and corresponding price data. In some embodiments, the transaction details can include a total price for the purchase transaction.

In process flow 506, the business management engine 114 transmits a payment request to the transaction management controller 112. The payment request includes a transaction amount and can be embodied as a Hypertext Transfer Protocol (HTTP) message. In embodiments in which the payment request is an HTTP message, the payment request can be embodied as an HTTP POST request or an HTTP PUT request. In such embodiments, one or more payment request parameters (e.g., transaction amount, payment type, etc.) can be sent to the transaction management controller 112 within a uniform resource locator (URL) that corresponds to the transaction management controller 112. Additionally or alternatively, the payment request can be embodied as an HTTP GET request or an HTTP DELETE request. In such embodiments, one or more of the payment request parameters can be sent to the transaction management controller 112 within the body of the HTTP message sent to the transaction management controller 112. It should be appreciated that, in some embodiments, the transaction management controller 112 can be a component of a computing environment (e.g., the ISV environment 110, the payments integrator environment 330, etc.) separate from the computing environment (e.g., the merchant computing environment 120) of the merchant computing device 122 that initiated the purchase transaction.

Subsequently, in process flow 508, the transaction management controller 112 requests payment card data for the initiated payment transaction from the POI device 124. In some embodiments, in processes flow 508, the transaction management controller 112 additionally manages payment selection options provided to a consumer via the POI device 124. For example, the transaction management controller 112 can transmit one or more instructions to the POI device 124 that cause the POI device 124 to display one or more selectable options (e.g., payment card type selection options, cashback selection options, language selection options, etc.) to a consumer. Additionally, as discussed above, the transaction management controller 112 can control other features and/or functions of the POI device 124 corresponding to a payment transaction.

In process flow 510, the POI device 124 transmits the payment card data to the transaction management controller 112. The payment card data can be captured by the POI device 124 in response to receipt of the request from the transaction management controller 112. Additionally, in embodiments in which the transaction management controller 112 manages the payment selection options provided to the consumer during the payment transaction, the selected options can be transmitted by the POI device 124 to the transaction management controller 112.

Subsequently, in process flow 512, the transaction management controller 112 transmits transaction data for the payment transaction to the payment network 130 for processing. To do so, the transaction management controller inserts or incorporates the transaction amount received from the business management engine 114 and the payment card data received from the POI device 124 into a payment authorization request message. In some embodiments, the payment authorization request message can be embodied as a HTTP message. Additionally, in some embodiments, the payment network 130 includes a payment gateway. In such embodiments, the payment gateway is configured to receive the payment authorization request message from the transaction management controller 112.

In process flow 514, the payment network 130 processes the payment transaction based on the payment authorization response message received from the transaction management controller 112. As discussed, the payment network 130 is configured to receive and forward the payment authorization request message to an issuer financial institution via an issuer processor. Thereafter, the issuer financial institution associates the received payment card number with an account held and/or maintained by the issuer financial institution. After associating the received payment card number with an account, the issuer financial institution generates a payment authorization response message. The payment authorization response message can then be transmitted to the payment network 130 via the issuer processor. Next, in process flow 516, the payment network 130 (or the payment gateway of the payment network 130) transmits the received payment authorization response message to the transaction management controller 112.

Subsequently, in process flow 518, the transaction management controller 112 and the POI device 124 finalize the payment transaction and, in some embodiments, the payment authorization response message. For example, in some embodiment, the transaction management controller 112 can instruct the POI device 124 to capture a signature for the payment transaction. Additionally or alternatively, in some embodiments, an integrated circuit payment card (e.g., an EMV card or other smartcard) can be inserted into the POI device 124, which can include corresponding integrated circuit payment hardware and functionality. In such embodiments, the transaction management controller 112 can instruct the POI device 124 to write payment transaction data or account data back to the integrated circuit payment card. It should be appreciated that the transaction management controller 112 and the POI device 124 can perform any other function to finalize the payment transaction.

In process flow 520, the transaction management controller 112 transmits the finalized payment authorization response message to the business management engine 114. In some embodiments, the business management engine 114 generates a receipt for the payment transaction based at least in part on, or otherwise as a function of, the finalized payment authorization response message received from the transaction management controller 112.

In some embodiments, in process flow 522, the business management engine 114 transmits payment details and/or a transaction summary to the merchant computing device 122. For example, in some embodiments, the business management engine 114 transmits received payment authorization response messages, or payment details derived from received payment authorization messages, to the merchant computing device 122 for display or review. Additionally or alternatively, the business management engine 114 transmits transaction summary data (e.g., product scan data, product name, product descriptions, prices, calculated taxes, totals, etc.) to the merchant computing device 122 for display or review.

Figure 6:
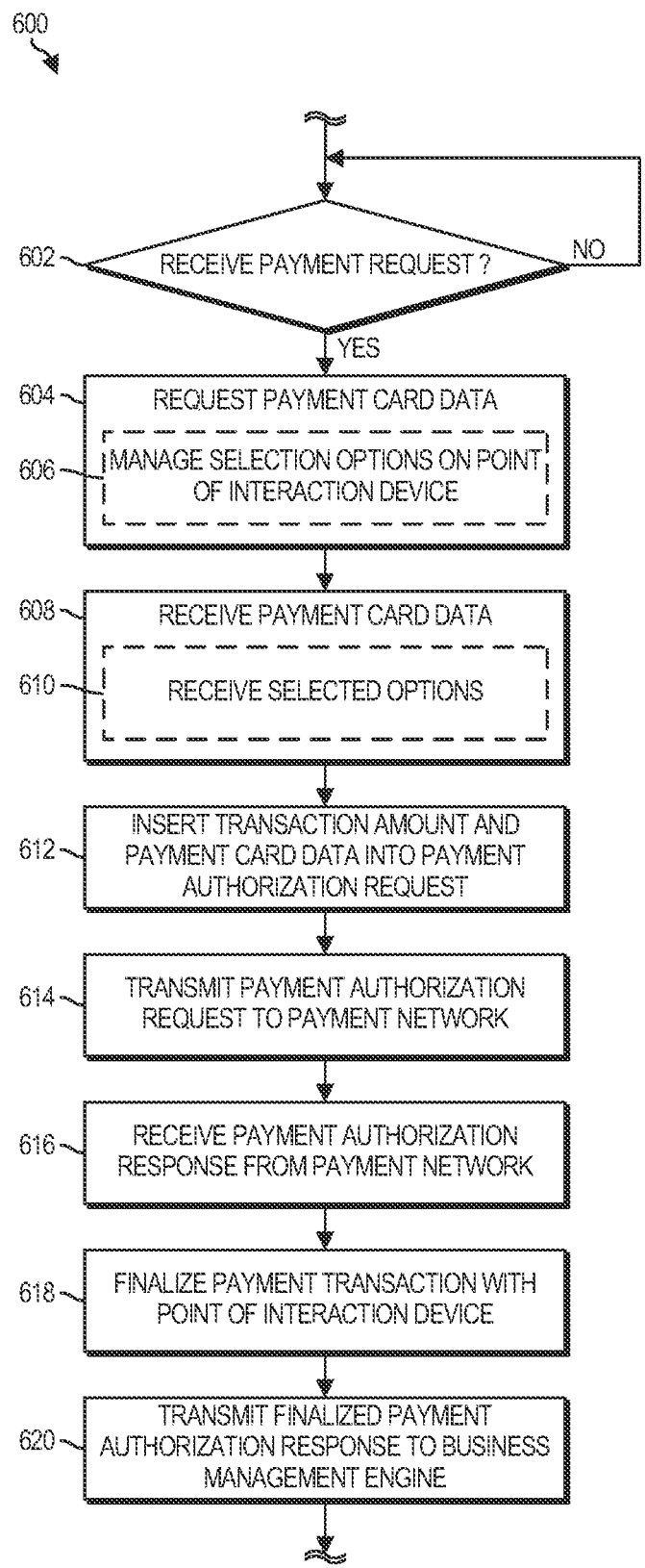
FIG. 6 is a simplified flow diagram of at least one embodiment of a method that may be executed by the transaction management controller of FIGS. 1-4 for remotely managing payment authorization request messaging for payment transactions.

Referring now to FIG. 6, a method 600 that may be executed by the transaction management controller 112 for managing payment authorization request messaging for payment transactions begins with decision block 602. In decision block 602, the transaction management controller 112 determines whether a payment request for a payment transaction is received from the business management engine 114. The payment request can include a transaction amount and can be embodied as a Hypertext Transfer Protocol (HTTP) message. If, in decision block 602, the transaction management controller 112 determines that a payment request is received, the method 600 advances to block 604. If, however, the transaction management controller 112 determines instead that a payment request is not received, the method 600 loops back to decision block 602 and the transaction management controller 112 continues monitoring for receipt of a payment request.

In block 604, the transaction management controller 112 requests payment card data for the payment transaction from the POI device 124. In some embodiments, in block 606, the transaction management controller manages selection options of the POI device 124 for the payment transaction. For example, the transaction management controller 112 can transmit one or more instructions to the POI device 124 that cause the POI device 124 to display payment card type selection options, cashback selection options, language selection options, or any other type of option selectable by a consumer during a payment transaction.

In block 608, the transaction management controller 112 receives the requested payment card data from the POI device 124. In some embodiments, the received payment card data includes a payment card number associated with a payment card used for the payment transaction. It should be appreciated, however, that the payment card data can include any other type of data associated with a payment transaction. In some embodiments, in block 610, the transaction management controller 112 receives any payment options selected by a consumer via the POI device 124.

In block 612, the transaction management controller 112 inserts or otherwise incorporates the transaction amount received from the business management engine 114 and the payment card data (e.g., the payment card number, etc.) received from the POI device 124 into a payment authorization request message. In some embodiments, the payment authorization request message can be embodied as a HTTP message. It should be appreciated, however, that the payment authorization request message can be embodied as any other type of message, in other embodiments.

In block 614, the transaction management controller 112 transmits the payment authorization request message to the payment network 130. As discussed, the payment network 130 can include a payment gateway communicatively coupled thereto configured to facilitate the transaction management controller 112 in processing payment transactions, in some embodiments. The payment network 130 can be configured to communicate with an issuer processor and/or and issuer financial institution and, based on the payment authorization request message, generate a payment authorization response message. In block 616, the transaction management controller 112 receives the payment authorization response message from the payment network 130 (or a payment gateway communicatively coupled thereto). In some embodiments, the payment authorization response message can be embodied as a HTTP message. It should be appreciated, however, that the payment authorization response message can be embodied as any other type of message, in other embodiments.

Subsequently, in block 618, the transaction management controller 112 finalizes the payment transaction and, in some embodiments, the payment authorization response message with the POI device 124. For example, in some embodiments, the transaction management controller 112 can instruct the POI device 124 to capture a signature for the payment transaction. In such embodiments, the transaction management controller 112 can receive captured signature data from the POI device 124. Additionally, in such embodiments, the payment authorization response message can be modified or augmented to include a byte array of the captured signature data. Additionally or alternatively, in some embodiments, the transaction management controller 112 can instruct the POI device 124 to write payment transaction data or account data back to an integrated circuit payment card used for a particular payment transaction.

In block 620, the transaction management controller 112 transmits the finalized payment authorization response message to the business management engine 114. In some embodiments, the business management engine 114 generates a receipt for the payment transaction based at least in part on, or otherwise as a function of, the finalized payment authorization response message received from the transaction management controller 112. In such embodiments, the business management engine 114 can be configured to print the generated receipt via a receipt printer communicatively coupled thereto.

Figure 7:
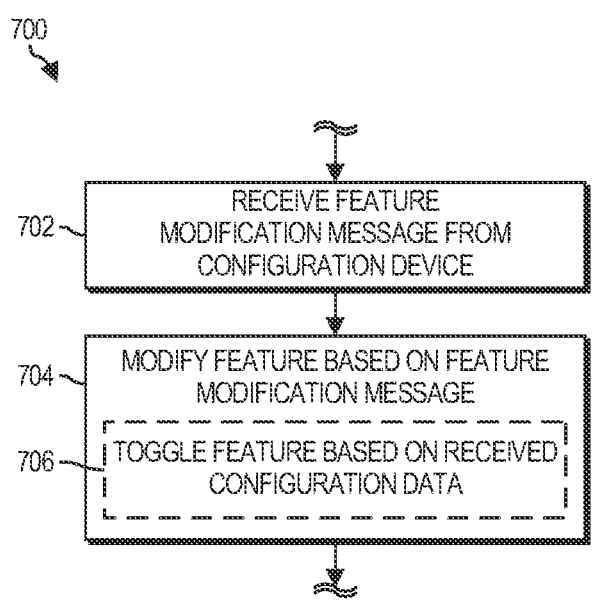
FIG. 7 is a simplified flow diagram of at least one embodiment of a method that may be executed by the transaction management controller of FIGS. 1-4 for modifying payment processing features.

Referring now to FIG. 7, a method 700 that may be executed by the transaction management controller 112 for modifying payment processing features begins with block 702. In block 702, the transaction management controller 112 receives a feature modification message from the configuration device 116. The feature modification message includes configuration data or instructions to at least one of add or modify a local payment processing feature of the transaction management controller 112 and/or other devices of the systems 100, 300, 400 (e.g., the POI device 124).

In block 704, the transaction management controller 112 modifies one or more local payment processing features based at least in part on, or otherwise as a function of, the received feature modification message. For example, in some embodiments, the transaction management controller 112 can, in block 706, toggle "on" or "off" (e.g., enable or disable) one or more local features based on the configuration data of the received feature modification message. In that way, the transaction management controller 112 (or other devices of the systems 100, 200, 300) can be remotely managed and configured.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for remotely managing payment authorization request messaging for payment transactions, the method comprising:
receiving, by a transaction management controller and from a business management engine, a transaction amount for a payment transaction, the payment transaction based on a purchase transaction initiated by a point-of-sale (POS) device of a merchant-specific environment, and the transaction amount for insertion by the transaction management controller into a payment authorization request message;
requesting, by the transaction management controller and from a card reader of the merchant-specific environment, payment card data for the payment authorization request message, wherein the business management engine and the POS device are communicatively isolated from the card reader;
receiving, by the transaction management controller and from the card reader, the requested payment card data for insertion by the transaction management controller into the payment authorization request message;
inserting, by the transaction management controller, the payment card data received from the card reader and the transaction amount received from the business management engine into the payment authorization request message;
transmitting, by the transaction management controller and to a payment network, the payment authorization request message;
receiving, by the transaction management controller and from the payment network, a payment authorization response message for the payment authorization request message; and
transmitting, by the transaction management controller and to the business management engine, the payment authorization response message.

2. The method of claim 1, further comprising:
dynamically controlling remotely, during processing of the payment transaction, by a processor of the transaction management controller located remotely from the merchant-specific environment, an interactive functionality of the card reader of the merchant-specific environment to display one or more user interface elements for specifying payment transaction processing options additional to one or more original payment transaction processing options present on the card reader.

3. The method of claim 1, wherein the authorization request message and the authorization response message comprise Hypertext Transfer Protocol messages.

4. The method of claim 1, further comprising:
receiving, by the transaction management controller and from the business management engine, product scan data and corresponding price data for the purchase transaction; and
managing, by the transaction management controller, display of the product scan data and corresponding price data on the card reader.

5. The method of claim 1, further comprising:
receiving, by the transaction management controller, a feature modification message from a configuration device.

6. The method of claim 5, wherein the feature modification message comprises configuration data to at least one of modify or add a feature of the card reader.

7. The method of claim 6, wherein to at least one of modify or add the feature of the card reader comprises to toggle on or toggle off the feature of the card reader based at least in part on the configuration data of the feature modification message, and wherein the feature corresponds to a driver configuration of the card reader.

8. A transaction management controller comprising:
a memory configured to store instructions; and
a processor configured to execute the instructions to perform operations comprising:
receiving, from a business management engine, a transaction amount for a payment transaction, the payment transaction based on a purchase transaction initiated by a point-of-sale (POS) device of a merchant-specific environment, and the transaction amount for insertion by the transaction management controller into a payment authorization request message;
requesting, from a card reader of the merchant-specific environment, payment card data for the payment authorization request message, wherein the business management engine and the POS device are communicatively isolated from the card reader;
receiving, from the card reader, the requested payment card data for insertion by the transaction management controller into the payment authorization request message;
inserting the payment card data received from the card reader and the transaction amount received from the business management engine into the payment authorization request message;
transmitting, to a payment network, the payment authorization request message;
receiving, from the payment network, a payment authorization response message for the payment authorization request message; and
transmitting, to the business management engine, the payment authorization response message.

9. The transaction management controller of claim 8, wherein the operations further comprise:
dynamically controlling remotely, during processing of the payment transaction, by the processor of the transaction management controller located remotely from the merchant-specific environment, an interactive functionality of the card reader of the merchant-specific environment to display one or more user interface elements for specifying payment transaction processing options additional to one or more original payment transaction processing options present on the card reader.

10. The transaction management controller of claim 8, wherein the authorization request message and the authorization response message comprise Hypertext Transfer Protocol messages.

11. The transaction management controller of claim 8, wherein the operations further comprise:
   receiving, from the business management engine, product scan data and corresponding price data for the purchase transaction; and
   managing display of the product scan data and corresponding price data on the card reader.

12. The transaction management controller of claim 8, wherein the operations further comprise:
   receiving, by the transaction management controller, a feature modification message from a configuration device.

13. The transaction management controller of claim 12, wherein the feature modification message comprises configuration data to at least one of modify or add a feature of the card reader.

14. The transaction management controller of claim 13, wherein to at least one of modify or add the feature of the card reader comprises to toggle on or toggle off the feature of the card reader based at least in part on the configuration data of the feature modification message, and wherein the feature corresponds to a driver configuration of the card reader.

15. A non-transitory computer-readable medium storing instructions that, when executed by a processor of a transaction management controller, cause the transaction management controller to perform operations comprising:
   receiving, from a business management engine, a transaction amount for a payment transaction, the payment transaction based on a purchase transaction initiated by a point-of-sale (POS) device of a merchant-specific environment, and the transaction amount for insertion by the transaction management controller into a payment authorization request message;
   requesting, from a card reader of the merchant-specific environment, payment card data for the payment authorization request message, wherein the business management engine and the POS device are communicatively isolated from the card reader;
   receiving, from the card reader, the requested payment card data for insertion by the transaction management controller into the payment authorization request message;
   inserting the payment card data received from the card reader and the transaction amount received from the business management engine into the payment authorization request message;
   transmitting, to a payment network, the payment authorization request message;
   receiving, from the payment network, a payment authorization response message for the payment authorization request message; and
   transmitting, to the business management engine, the payment authorization response message.

16. The non-transitory computer-readable medium of claim 15, wherein the operations further comprise:
   dynamically controlling remotely, during processing of the payment transaction, by a processor of the transaction management controller located remotely from the merchant-specific environment, an interactive functionality of the card reader of the merchant-specific environment to display one or more user interface elements for specifying payment transaction processing options additional to one or more original payment transaction processing options present on the card reader.

17. The non-transitory computer-readable medium of claim 15, wherein the authorization request message and the authorization response message comprise Hypertext Transfer Protocol messages.

18. The non-transitory computer-readable medium of claim 15, wherein the operations further comprise:
   receiving, from the business management engine, product scan data and corresponding price data for the purchase transaction; and
   managing display of the product scan data and corresponding price data on the card reader.

19. The non-transitory computer-readable medium of claim 15, wherein the operations further comprise:
   receiving, by the transaction management controller, a feature modification message from a configuration device.

20. The non-transitory computer-readable medium of claim 19, wherein the feature modification message comprises configuration data to at least one of modify or add a feature of the card reader, wherein to at least one of modify or add the feature of the card reader comprises to toggle on or toggle off the feature of the card reader based at least in part on the configuration data of the feature modification message, and wherein the feature corresponds to a driver configuration of the card reader.

* * * * *